Feb. 27, 1962    S. LINDEN    3,023,047
CHILD'S CAR SEAT
Filed Feb. 10, 1959

INVENTOR.
Samuel Linden
BY
Roberts, Cushman & Grover
ATT'YS

United States Patent Office 3,023,047
Patented Feb. 27, 1962

3,023,047
CHILD'S CAR SEAT
Samuel Linden, Swampscott, Mass., assignor to Bunny Bear Inc., Everett, Mass., a corporation of Massachusetts
Filed Feb. 10, 1959, Ser. No. 792,416
2 Claims. (Cl. 297—254)

This invention pertains to a child's seat and relates, more particularly, to a child's car seat having means for mounting the seat on the back rests of automobile seats.

Conventional car seats for children have been provided with supporting means which permitted mounting of the seats either on the back rest of the front seat of an automobile or on the back rest of the rear seat of an automobile but, since the structural arrangement of front seats in almost all automobiles is radically different from rear seat construction in the same automobiles, no safe, convenient and inexpensive car seat for children has been provided which could be used in both front and rear seats of automobiles.

It is an object of this invention to provide a safe, convenient and inexpensive car seat for children which may be selectively mounted on either the front or rear seat of an automobile.

In accordance with the foregoing object, the invention comprises a child's car seat having a seat and back portion, a pair of U-shaped brackets adapted for suspending the seat from the back rest of the front seat of an automobile, the brackets being pivotally mounted on the back portion of the child's seat for movement between a rearwardly extending, operative position and an inoperative position parallel to the back portion of the child's seat, and a pair of flexible straps attached at one end to the back rest of the child's seat, the straps having hooks at their remote ends adapted for suspending the seat from the back rest of the rear seat of an automobile. The brackets may be used for mounting the child's seat on the back rest of the front seat of an automobile when desired, the flexible straps then hanging loosely in an inoperative position; or the straps may be used for mounting the child's seat on the back rest of the rear seat of an automobile, the brackets, in that instance, being pivoted to an inoperative position parallel to the back of the child's seat.

Figure 1:
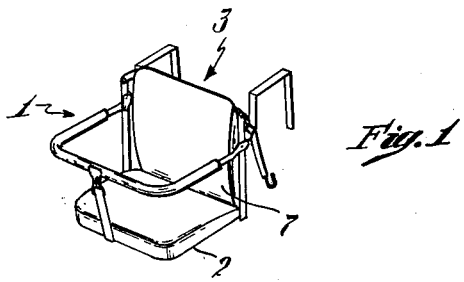
Figures 2, 3:
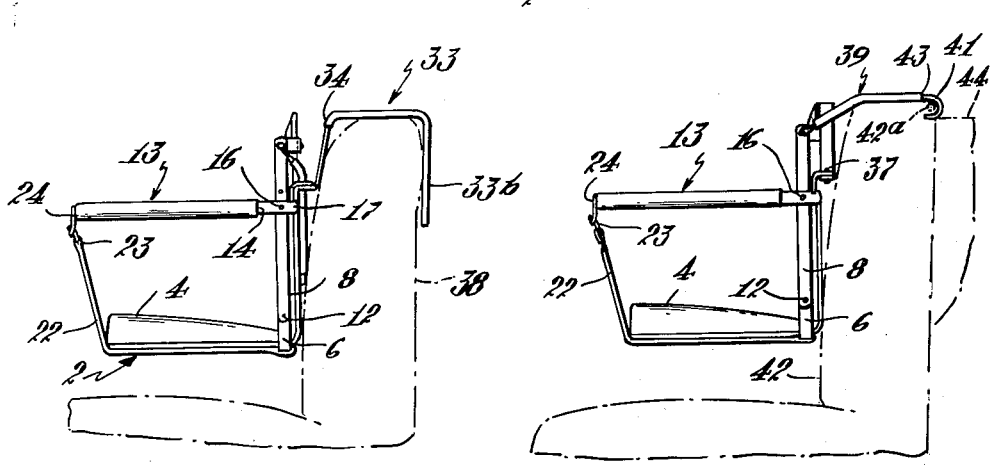
Figures 4, 5:
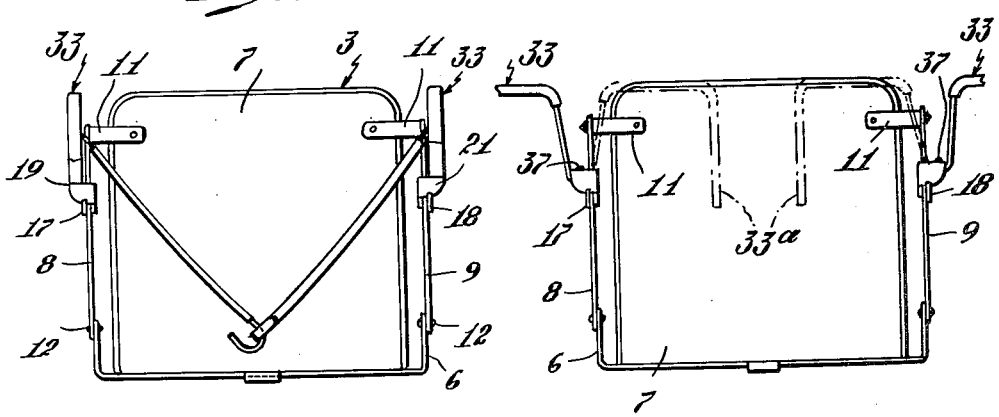

Other objects, advantages, and details of construction will appear in the following description which refers to the drawings in which:

FIG. 1 is a perspective view of a child's car seat;
FIG. 2 is a side elevation of the child's car seat showing the seat mounted on the back rest of an automobile front seat;
FIG. 3 is a side elevation of the child's car seat showing the seat mounted on the back rest of an automobile rear seat;
FIG. 4 is a rear elevation, partially cut away, similar to FIG. 2; and
FIG. 5 is a rear elevation, partially cut away, similar to FIG. 3.

Referring to the drawings, FIG. 1, there is shown a child's seat 1 having a seat portion 2 and a back portion 3. The seat portion 2 comprises a rigidly backed seat cushion 4 which is fastened at its rear end to a U-shaped bracket 6 (FIG. 2), the legs of which project upwardly at opposite sides of the seat. The back portion 3 comprises a rigid back cushion 7 fastened by brackets 11 at its upper end, between the upper ends of side supports, 8 and 9 (FIG. 4), the lower ends of which are pivotally interconnected by pivot pins 12 to the legs of the bracket 6, so that the seat may be folded if desired. It is to be understood, however, that, although a particular seat and back construction is here illustrated, any generally similar type of child's seat is within the scope of this invention.

A U-shaped retaining rail 13, substantially covered in conventional manner with a guard 14 of rubber or similar cushioning material, is pivotally mounted on the side members 8 and 9 by pivot pins 16. The ends, 17 and 18, of the retaining rail extend rearwardly of their pivots and their side supports 8 and 9 for engagement with the undersides of laterally extending bosses 19 and 21 respectively, fastened to the support, which thereby support the rail rigidly in a horizontal position perpendicular to the back, permitting however upward swinging movement of the rail to a position parallel to the back. As thus constructed, when the retaining rail occupies the horizontal position, shown in FIGS. 2 and 3, it serves to retain a child in the seat while seated therein. The rail may, however, be raised to clear the child's head to afford ease in placing the child on the seat or removing him therefrom.

A strap 22 attached at one end to the seat portion 2 has a strap fitting 23 which may be detachably connected to a hook 24 which is mounted at the center of the rail 13. When the strap fitting and the rail hook are interconnected, the strap 22 serves to suspend the forward end of the seat portion 2 from the rail in a horizontal operative position, but, when the strap fitting and rail hook are detached, the child's seat may be folded upwardly, substantially parallel to the back or downwardly substantially into the plane of the back. In either position the child may stand on the car seat behind the rail. By folding the seat upwardly, parallel to the back, the child's seat may conveniently be packaged for storage or shipment.

For supporting the child's seat from the back rest of the front seat of the automobile each of a pair of U-shaped brackets 33, substantially covered with a guard 34 of rubber or similar cushioning material, is pivotally mounted on one of the bosses 19 and 21 by a vertically disposed pivot pin 37. The brackets may thus be swung between rearwardly extending operative position, substantially at right angles to the back, as indicated in FIG. 2, where the brackets are adapted for suspending the child's seat from the back rest 38 of the front seat of an automobile, to an inoperative position, substantially parallel to the back rest 3. The inoperative position of the bracket is indicated in FIG. 5, the dotted lines 33a showing an alternate inoperative position.

Since the configuration of the back rest of the front seat in almost all automobiles is not sufficiently square in transverse section to permit the use of conventional U-shaped suspension brackets of short length, the brackets 33 are provided with relatively long rear legs 33b which extend downwardly against the back to insure safe mounting of the child's car seat, and also to prevent tearing of the back rest upholstery, as will be seen by reference to FIG. 2.

For mounting the child's seat on the back rest of the back seat of the automobile a pair of pliable straps 39 is attached at one end to the respective side members 8 and 9. These straps are provided at their remote ends with hooks 41 adapted for engagement with the rear side of the back rest 42, as shown in FIG. 3. The straps are made flexible so as to be conformable to the top of the back rest and to be readily removable from their rearwardly extending operative position shown in FIG. 3, to the inoperative position shown in FIG. 1. Alternatively, the hooks 41 may be interengaged as shown in FIG. 4 when the straps are in inoperative position. The straps may be made of wire or cord or similar material and preferably are substantially covered with a guard 43 of rubber or similar cushioning material and may be adjustable in length.

The rear side of the back rest of the rear seat in almost all automobiles is short because of the window shelf 44, which extends rearwardly from the back seat near the top. Thus, there is not enough clearance behind the back rest for receiving hooks of the kind appropriate for suspending the child's seat from the front seat. Accordingly, the hooks 41 are designed to engage the rear side of the back rest and preferably to project into the back side of the back rest by depression of the covering without penetration, sufficiently to engage the upper frame member 42a of the back rest, as shown in FIG. 3. In any event whether the hooks actually project inwardly below the frame of the back rest, or not, the flexibility of the straps permits disposing the hooks behind the back rest, substantially on a level with their points of attachment to the back so that the pull on the hook is substantially horizontal. Moreover since the straps are flexible there is no lever action which would tend to displace the hooks upwardly out of engagement with the back.

From the foregoing it is evident that the child's seat is especially designed by the provision of the two sets of hooks for suspending it from either the back rest of the front seat of an automobile, or from the back rest of the back seat.

It should be understood that the present disclosure is for the purpose of illustration only and that this invention includes all modifications and equivalents which fall within the scope of the appended claims.

I claim:

1. In a child's seat for use in an automobile, a rigidly-backed cushion at the back of the seat, a pair of rigid suspension brackets pivotally mounted on the seat below the top of said cushion, each of said brackets having vertically extending portions for engagement with the front and back sides of the back rest of the front automobile seat, and an intermediate horizontal portion for engagement with the top of said back rest, each of said brackets being adapted for movement between a rearwardly extending operative position and an inoperative position parallel to and laying flat against said cushion, and a pair of flexible straps connected at one end to each side of the seat adjacent the top of said cushion, each strap having a hook at its other end, each of said hooks having horizontally extending portions for engagement with the top and underside of the frame of the back rest of the rear automobile seat, and an intermediate vertical portion for engagement with the back side of said back rest frame.

2. The combination with a child's chair seat for use in an automobile, a rigid back and two pairs of U-shaped suspension hooks of different size alternately useable to support the seat in suspension optionally on the back of the front seat or the back of the back seat of the automobile, the open sides of the U-shaped hooks of larger size facing downwardly with respect to the bottom of the chair seat for embracing engagement with the top of the back of the front seat of the automobile, and the open sides of the U-shaped hooks of smaller size being adapted to be disposed so as to face forwardly with respect to the back of the chair seat for embracing the rear sides of the back of the back seat of the automobile, said larger pair of hooks being pivotally mounted on the back of the chair seat so as to be foldable behind the back side of the back of the chair seat when the smaller pair of hooks are employed and the smaller pair of hooks being flexibly connected to the back of the chair seat so as to be free to be hooked together and to hang down at the back side of the back of the chair seat when the larger pair are being used.

References Cited in the file of this patent

UNITED STATES PATENTS

| | | |
|---|---|---|
| 923,078 | Riddle | May 25, 1909 |
| 1,129,606 | Ruel | Feb. 23, 1915 |
| 2,516,557 | Frazee et al. | July 25, 1950 |
| 2,541,501 | Criner | Feb. 13, 1951 |
| 2,574,743 | King | Nov. 13, 1951 |